Patented Sept. 21, 1943

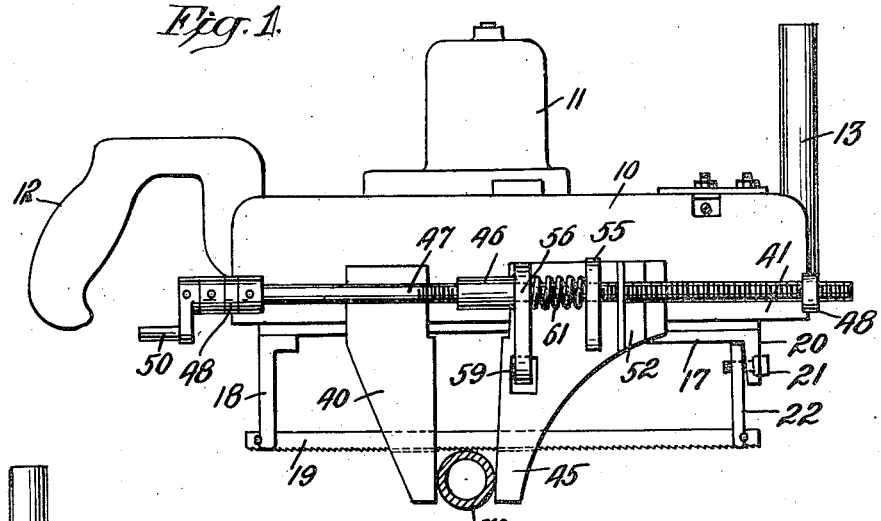
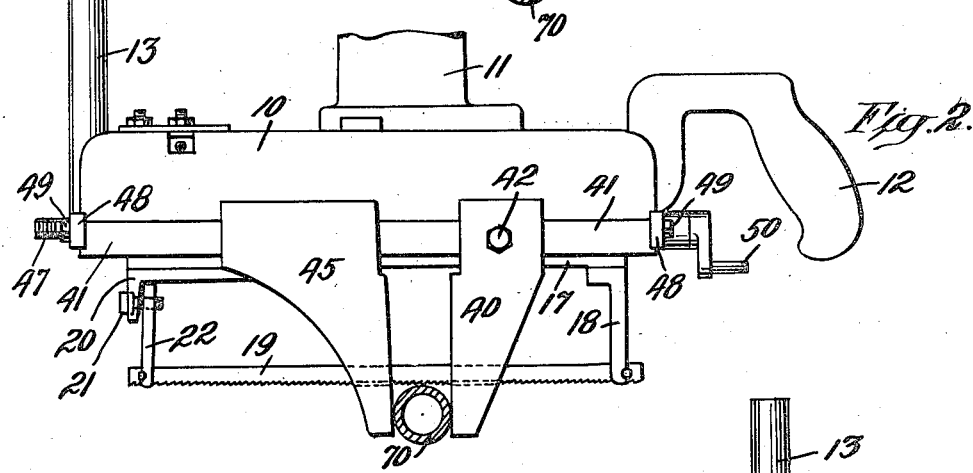
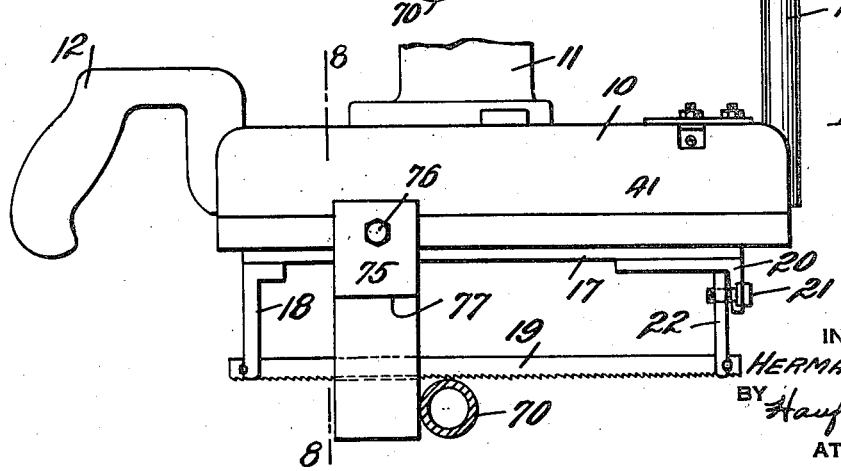

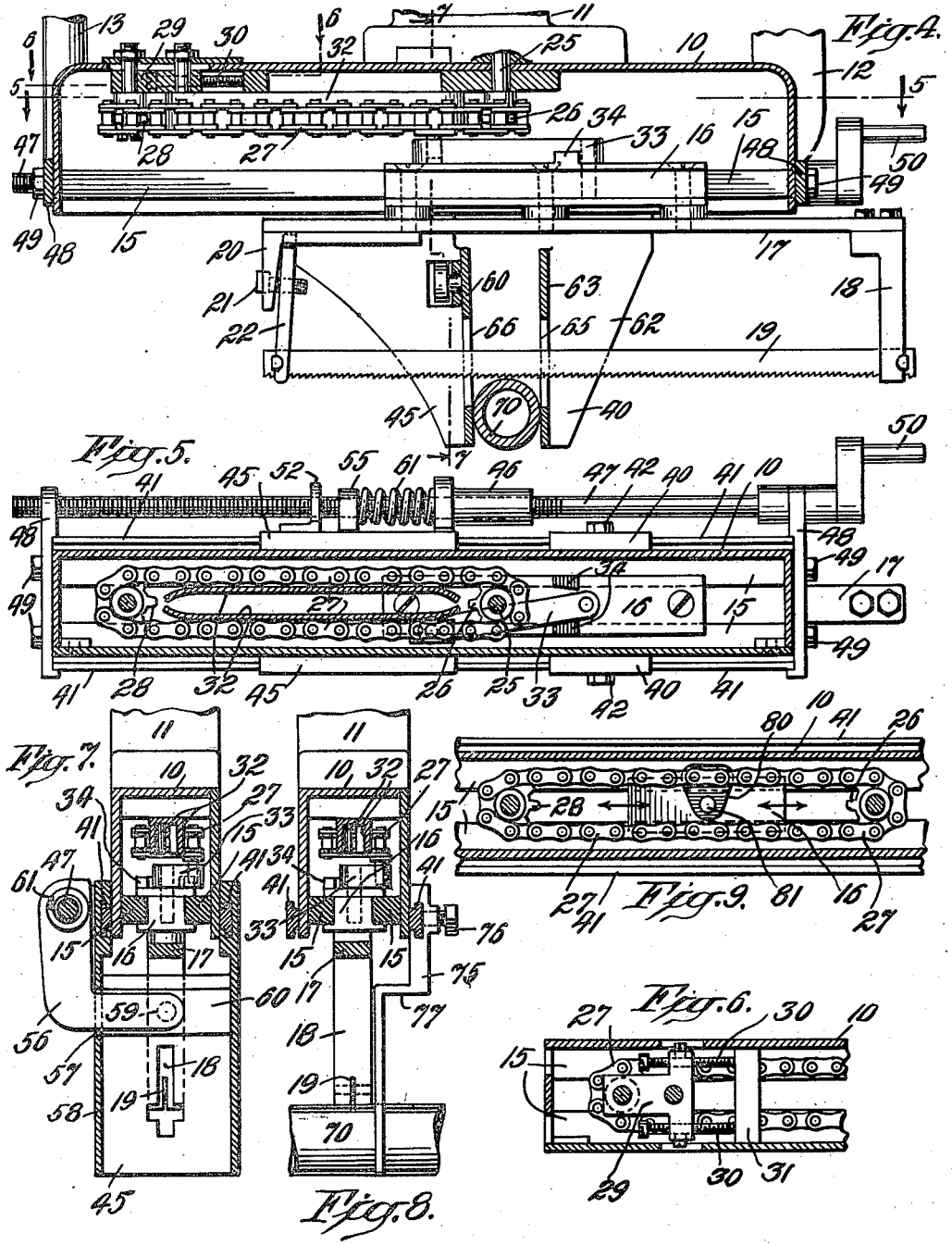

2,329,729

UNITED STATES PATENT OFFICE 2,329,729

PORTABLE CUTTING TOOL

Herman Saucke, New York, N. Y.

Application May 4, 1942, Serial No. 441,569

4 Claims. (Cl. 29—73)

This invention relates to a tool and more particularly to a motor operated hack saw or the like of the type set forth in my Patent 2,158,866, dated May 16, 1939.

An object of the invention is to provide a tool of the above type having novel and improved details of construction and features of operation.

Various other objects and advantages will be apparent as the nature of the invention is more fully disclosed.

Although the novel features which are believed to be characteristic of this invention will be pointed out more particularly in the claims appended hereto, the invention itself may be better understood by referring to the following description, taken in connection with the accompanying drawings, in which a specific embodiment has been set forth for purposes of illustration.

In the drawings:

Fig. 1 is a side elevation of a tool embodying the present invention.

Fig. 2 is a side elevation of the tool taken from the opposite side thereof.

Fig. 3 is a side elevation of the tool illustrating a further embodiment of the invention.

Fig. 4 is a vertical longitudinal section of the tool as shown in Fig. 2.

Fig. 5 is a horizontal section taken on the line 5—5 of Fig. 4.

Fig. 6 is a partial horizontal section taken on the line 6—6 of Fig. 4.

Fig. 7 is a transverse section taken on the line 7—7 of Fig. 3, and

Fig. 8 is a transverse section taken on the line 8—8 of Fig. 4.

Fig. 9 is a view similar to Fig. 5 illustrating a different embodiment of the invention.

In the following description and in the claims certain specific terms are used for convenience in referring to various details of the invention. These terms, however, are to be given as broad an interpretation as the state of the art will permit.

Referring to the drawings more in detail, the invention is shown as applied to a tool having a housing 10 carrying a driving motor 11 and handles 12 and 13 by which the device may be manipulated. The housing 10 carries a pair of guide rails 15, Figs. 4 and 5, between which a slide 16 is mounted for longitudinal sliding movement. The slide 16 carries a frame 17 having at one end a finger 18 to which a hack saw blade 19 is attached and having at the other end a finger 20 to which is adjustably secured, by means of a screw 21, an arm 22 carrying the other end of the hack saw blade 19.

The motor 11 is provided with a shaft 25 which extends through the housing 10 and carries a driving sprocket 26 which drives a chain 27. The chain 27 passes over an idler sprocket which is mounted on a slidable bracket 29 (Fig. 6) and is adjustably secured to the housing 10 by set screws 30 engaging a fixed bar 31. In order to prevent the chain from vibrating a pair of chain guides 32 (Fig. 5) are provided against which the chain rests. A pivoted link 33 connects the slide 16 to one of the links of the chain 27. The slide 16 is provided with stop members 34 which limit the movement of the link 33 and prevent any side pull from being transmitted from the link to the chain.

A jaw 40 is mounted on rails 41 which are attached to the housing 10. The jaw may be adjusted longitudinally and may be held in adjusted position by means of bolts 42. A second jaw 45 is slidably mounted on the rails 41 and carries a flange 52 through which a rod 47 extends. The rod 47 is mounted in brackets 48 attached to the ends of the housing 10 by means of bolts 49 and is provided with an adjusting handle 50 for the purpose to be described. A sleeve 46 is slidably mounted on the rod 47 and is provided with an arm 56 extending through an aperture 57 in the side wall 58 of the jaw 45 and carrying a pin 59 which bears against the end wall 60 of the jaw 45, at about the center line thereof. A spring 61 is seated between the sleeve 46 and a bar 55 which is threaded on the rod 47. The jaw 40 is provided with side walls 62 and with an end wall 63 similar to the walls 58 and 60 of the jaw 45. The end walls 60 and 63 of the jaws 40 and 45 are shown as tapering inwardly from top to bottom, that is, the jaws are closer together at the bottom than at the top. The hack saw blade 19 extends through slots 65 and 66 in the end walls 63 and 60 of the jaws 40 and 45 respectively.

In the operation of the above described device, rotation of the motor 11 drives the chain 27 and causes the slide 16 and hack saw blade 19 to reciprocate. The work, to be cut such as a pipe 70, is positioned between the jaws 40 and 45 and the handle 50 is turned to bring the jaws into close engagement therewith. It is to be noted that the pressure is exerted on the jaw 45 by means of the spring 61, which is compressed between the bar 55 and the sleeve 46 as the bar 55 is fed along the rod 47. The arm 56 which is carried by the sleeve 46 is thus caused to bear against the wall 60 of the jaw 45. The work piece 70 is thus clamped with a resilient pressure between the two jaws and the inclined position of the walls 60 and 63 of the two jaws facilitates the downward movement of the jaws as the work progresses. It is to be understood, of course, that the jaws may be made straight instead of tapered, if desired.

When the work is to be released the handle 50 is turned to feed the bar 55 in the opposite direction. When this bar reaches the flange 52 it causes the jaw 45 to slide outwardly along the rails 41. During this operation the guide 32 and the stop members 34 eliminate vibration of the chain 27 and cause the device to operate quietly and efficiently.

It is to be noted that a comparatively long stroke is obtained by means of the chain drive without correspondingly increasing the width of the device. Furthermore the size of the driving sprocket 26 determines the power available for driving the frame.

It is to be understood that if the device is to be operated in a limited space the jaws may be made narrower than shown or may be restricted to one side only of the blade 19.

The device may also be used with a stationary guide in place of the jaws 40 and 45 as illustrated in Figs. 3 and 8. In this embodiment the brackets 48 have been removed, together with the rod 47 and jaws 40 and 45. In place thereof a bracket 75 is provided which is slidably mounted on one of the rails 41 and is adjustably secured by means of a set screw 76. The bracket 75 is bent inwardly at 77 so as to engage the pipe 70 close to the blade 19. A guide of this type permits the tool to be used where space is very limited.

A modified type of drive is shown in Fig. 9 in which the link 33 is replaced by a bracket 80 which is pivoted at 81 to the slide 16. The bracket 80 is attached to one of the links of the chain 27 and is designed to pass around the sprockets 26 and 28 with the chain 27. In this embodiment the stroke of the slide 16 is somewhat reduced as it becomes equal to the distance between the centers of the two sprockets.

The above described tool may be operated with a built-in motor as shown, or the shaft 25 may be adapted to be connected to an electric drill or the like, or in certain instances may be connected to a hand brace.

Although a specific embodiment of the invention has been shown for purposes of illustration it is to be understood that various changes and modifications may be made therein as will readily appear to a person skilled in the art. The invention is only to be limited in accordance with the following claims.

What is claimed is:

1. A portable cutting tool comprising a housing, a driving shaft journalled therein, a frame mounted on said housing for reciprocating movement in a direction transverse to the axis of said shaft and having members to support a saw blade, a driving sprocket carried on said shaft, an idler sprocket carried by said housing and spaced along the path of movement of said frame from said driving sprocket, a chain extending around said sprockets, a link pivoted at one end to said chain and at its other end to said frame at a point lying in the same plane with the axes of said sprockets for swinging movement as the chain passes around said sprockets, stop means on said frame to limit the swinging movement of said link and stationary guide members extending along said chain between said sprockets to take up the side thrust on said chain caused by the angular position of said link and to cooperate with said stop means to prevent vibration of said chain.

2. A portable cutting tool comprising a housing, a driving shaft journalled therein, a frame mounted on said housing for reciprocating movement in a direction transverse to the axis of said shaft and having members to support a saw blade, a driving connection between said driving shaft and said frame, a stationary guide rail on said housing extending along the path of movement of said frame, a pair of jaw members slidably mounted on said rail and having walls transverse to said rail to grip the work piece being sawed, means adjustably securing one of said jaw members to said rail, and means adjustably and resiliently securing the other of said members for limited movement along said rail, said last means comprising a threaded rod extending along said housing parallel to said rail, a member freely slidable on said rod and having an arm bearing against said last jaw member to apply gripping pressure thereto and to cause said jaw member to slide along said rail, a member threaded on said rod to be fed therealong by turning said rod, a spring seated between said last two members to form a resilient connection therebetween for feeding said last jaw member into gripping engagement with said work piece.

3. A portable cutting tool comprising a housing, a driving shaft journalled therein, a frame mounted on said housing for reciprocating movement in a direction transverse to the axis of said shaft and having members to support a saw blade, a driving connection between said driving shaft and said frame, a stationary guide rail on said housing extending along the path of movement of said frame, a pair of jaw members slidably mounted on said rail and having walls transverse to said rail to grip the work piece being sawed, means adjustably securing one of said jaw members to said rail, and means adjustably and resiliently securing the other of said members for limited movement along said rail, said last means comprising a threaded rod extending along said housing parallel to said rail, a member freely slidable on said rod and having an arm bearing against the transverse wall of said last jaw member at about the center line thereof to apply gripping pressure thereto and to cause said jaw member to slide freely along said rail, a member threaded on said rod to be fed therealong by turning said rod, a spring seated between said last two members to form a resilient connection therebetween for feeding said last jaw member into gripping engagement with said work piece.

4. A portable cutting tool comprising a housing, a driving shaft journalled therein, a frame mounted on said housing for reciprocating movement in a direction transverse to the axis of said shaft and having members to support a saw blade, a driving connection between said driving shaft and said frame, a stationary guide rail on said housing extending along the path of movement of said frame, a pair of jaw members slidably mounted on said rail and having walls transverse to said rail to grip the work piece being sawed, means adjustably securing one of said jaw members to said rail, and means adjustably and resiliently securing the other of said members for limited movement along said rail, said last means comprising a threaded rod extending along said housing parallel to said rail, a member freely slidable on said rod and having an arm bearing against the transverse wall of said last jaw member at about the center line thereof to apply gripping pressure thereto and to cause said jaw member to slide freely along said rail, a member threaded on said rod to be fed therealong by turning said rod, a spring seated between said last two members to form a resilient connection therebetween for feeding said last jaw member into gripping engagement with said work piece, and a stop member on said last jaw member in a position to be engaged by said threaded member when fed in the reverse direction for retracting said jaw member, said stop member having sufficient clearance with said threaded member to permit retraction of said threaded member for releasing the spring pressure on said jaw prior to engagement of said stop member, whereby the jaw is freely retractable along said rail.

HERMAN SAUCKE.